United States Patent [19]

Shantzis et al.

[11] Patent Number: 5,695,115
[45] Date of Patent: *Dec. 9, 1997

[54] MODULAR TRASH CHUTE AND ROOM FOR MULTISTORY BUILDING

[76] Inventors: Mark D. Shantzis, 6061 Collins Ave., #6F, Miami Beach, Fla. 33147; Michael Bracken, 224 W. Mashta Dr., Key Biscayne, Fla. 33149

[*] Notice: The term of this patent shall not extend beyond the expiration date of Pat. No. 5,568,871.

[21] Appl. No.: 634,055

[22] Filed: Apr. 17, 1996

[51] Int. Cl.⁶ ........................................... B65D 91/00
[52] U.S. Cl. ..................... 232/43.2; 232/44; 209/706; 209/932
[58] Field of Search ................. 232/43.2, 43.1, 232/43.4, 43.5, 44; 209/932, 933, 706, 702, 655

[56] References Cited

U.S. PATENT DOCUMENTS

| | | | |
|---|---|---|---|
| 2,177,328 | 10/1939 | Pender. | |
| 3,658,242 | 4/1972 | Van De Pol. | |
| 4,640,403 | 2/1987 | McDermott | 193/34 |
| 4,987,988 | 1/1991 | Messina et al.. | |
| 5,031,829 | 7/1991 | Shantzis | 232/43.2 |
| 5,090,546 | 2/1992 | McDermott | 193/34 |
| 5,155,976 | 10/1992 | Okabe et al. | 232/44 X |
| 5,221,010 | 6/1993 | Bianco | 232/43.2 X |
| 5,257,577 | 11/1993 | Clark | 100/99 |
| 5,568,871 | 10/1996 | Shantzis | 209/706 X |

FOREIGN PATENT DOCUMENTS

| | | |
|---|---|---|
| 2407482 | 8/1975 | Germany. |
| 9201615 | 2/1992 | WIPO. |

*Primary Examiner*—Blair Johnson
*Attorney, Agent, or Firm*—Alvin S. Blum

[57] ABSTRACT

A waste chute for a multistory building is made up of modules stacked one upon the other. Each module has a vertical section of waste chute enclosed within a fire safe room. The chute sections are arranged to nest together to form a continuous chute when the modules are positioned on one another. Each room is provided with a door providing access to the room. The chute section is provided with a self closing access door. An alternative embodiment of the invention provided a module for more than one story. The multistory module has a room for each story. By integrating the chute section with the chute room in a prefabricated module, the construction of a building is facilitated. The costs and complications of having multiple trades working on the chute system are avoided. The invention may be practiced with a system for collecting different types of trash in different receptacles beneath the chute. Prewired controls in the module at each chute access door select the receptacle beneath the chute.

17 Claims, 3 Drawing Sheets

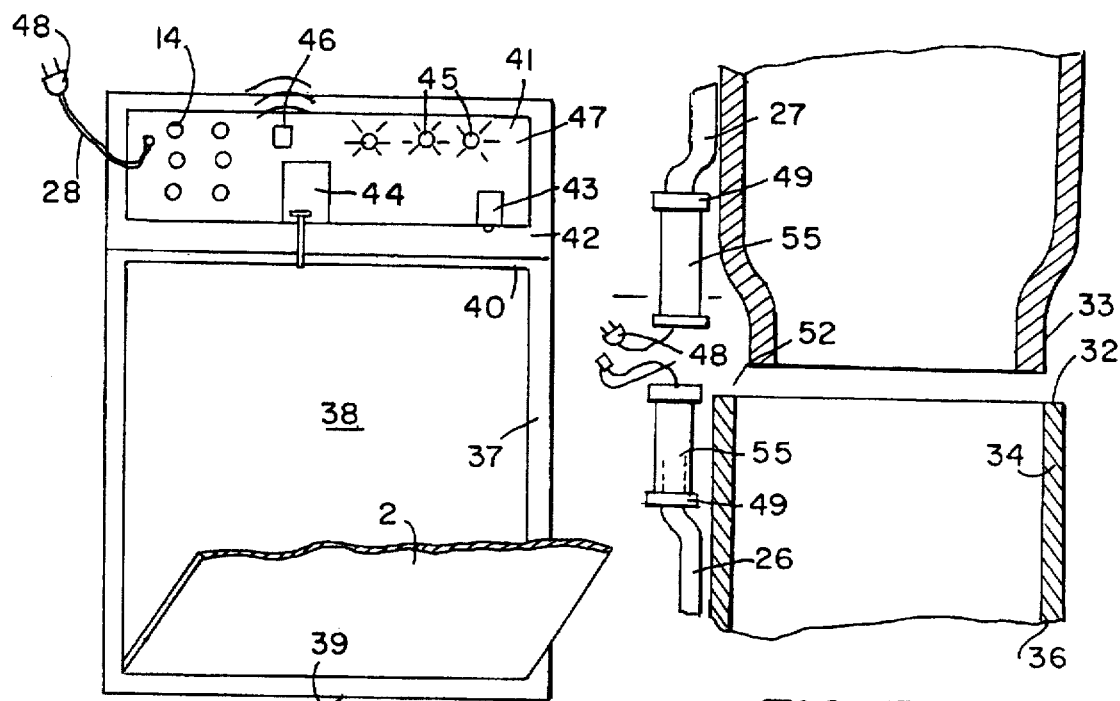
FIG. 8
FIG. 7
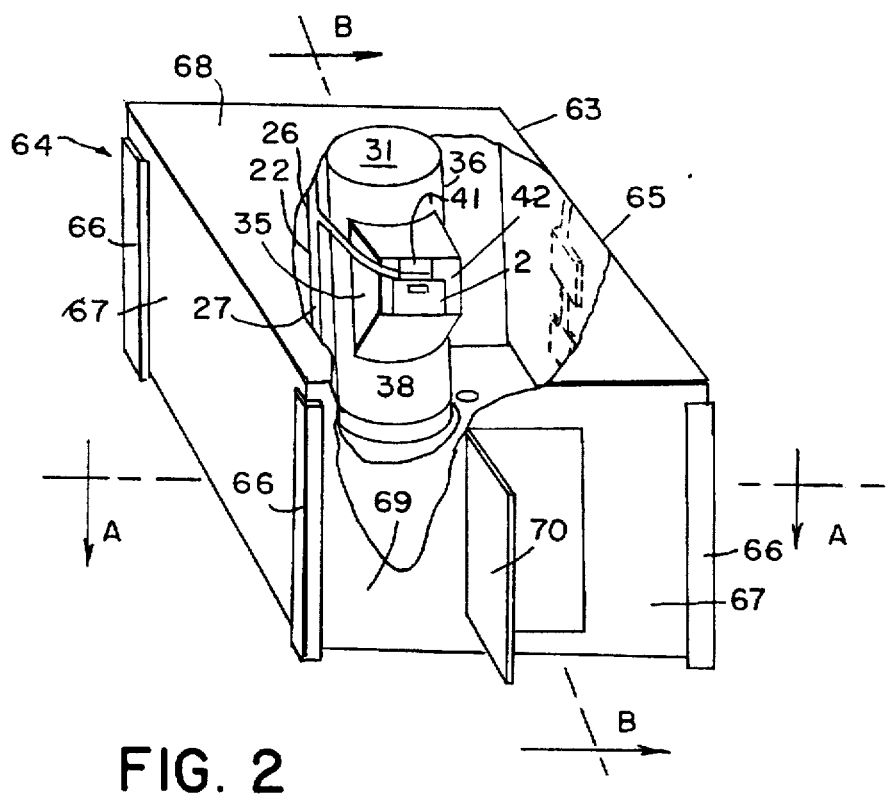
FIG. 2

1

MODULAR TRASH CHUTE AND ROOM FOR MULTISTORY BUILDING

TECHNICAL FIELD

This invention relates to waste disposal chutes and their rooms in multistory buildings, and more particularly to a modular unit incorporating both a chute room and a single story segment of a multistory waste disposal chute for economy and safety of construction.

BACKGROUND OF THE INVENTION

It is common practice in multistory buildings to provide a waste disposal chute with an access door at each floor so that waste may be delivered by gravity to a basement waste receptacle.

U.S. Pat. No. 5,031,829 issued Jul. 16, 1991 to the applicant discloses a system using a single chute in a multistory building to collect into separate large receptacles different categories of wastes already separated by the tenant for recycling. A turntable carries a large receptacle for each category of waste. Control means on each floor enables a tenant to operate the turntable remotely to position a selected receptacle beneath the chute to receive a particular category of waste. A controller and interlocks on the chute access doors prevent conflicts between floors.

The control means of the prior art have been enclosed in a housing attached to the wall adjacent each chute door. A wiring conduit connects the housings on all of the floors and the basement where the remotely controlled turntable moves a selected container beneath the chute. Considerable expense is involved in hiring local labor to drill conduit holes between floors, wire the controls and fasten the housings in place. These installation processes require hiring separate categories of construction workers due to local employment rules. These workers, being unfamiliar with the special requirements of the apparatus, may make costly and time consuming errors in the installation. These errors may require considerable post installation effort from the manufacturer and reflect adversely on the reputation of the system. A new system such as this apparatus requires cooperation from all of the tenants using the system. If there are problems associated with inept installation, adverse first impressions of the tenants can lead to a prolonged lack of cooperation in use of the system.

Fire safety codes generally require that the chute access door be within a fire safe room that is fire isolated from the remainder of the area on that floor level. The regulations may require specific fire sprinklers, lighting, plumbing, entry door and drain for the room containing the chute access door.

Considerable expense is added to the cost of providing such a facility because so many different subcontractors and skilled craftsman must be brought to the construction site to install the various services at different times during construction, as well as the cost in fees and time devoted to inspections.

DISCLOSURE OF THE INVENTION

It is accordingly an object of the invention to provide a modular waste chute room. The modular chute room is a single self-contained fire rated box type unit. It may include factory pre-installed fire sprinkler, lighting, plumbing and fixtures, a recycling control system, a trash chute opening, a trash chute door, a floor, a ceiling, walls, a drain, an entry door frame and door from hallway, or stairwell, among other possible features that could be incorporated in the vicinity of the trash chute room on each floor of a multistory building.

The intent is that modular chute rooms be stacked on top of each other, either attached to each other floor to ceiling, or secured to an existing or planned floor, ceiling, walls or possibly free standing. The purpose of the modular chute room is to reduce the cost of reproducing the same or similar rooms on different floors of a building by incorporating many of the expensive sub-contracted elements of a trash chute room in a pre-fabricated modular room, mass produced at a lower cost, off premises.

Pre-fabrication also eliminates the expensive process of the general contractor's coordination of many different sub-contractors and increases the level of quality control of duplicating repetitive trash chute room dimensions and features on each floor with minimal oversight by the general contractor.

Another benefit of the modular trash chute room is that the responsibility of several sub-contractors will now be replaced by only one vendor, making the construction oversight process less tedious for the general contractor.

Another benefit of the modular trash chute room is that it can be rated by existing health and safety standards organizations (such as, NFPA, OSHA and ASTN) in mass quantities at the pre-fabrication factory. This will save state and local inspectors enormous amounts of time (and taxpayers money) that was previously spent going floor-to-floor in a new building to inspect each trash chute room.

These and other objects, advantage, and features of the invention will become more apparent when the detailed description is studied in conjunction with the drawings in which like reference characters designate like elements in the various figures.

BRIEF DESCRIPTION OF THE DRAWINGS

FIG. 2 is a perspective view of the trash chute and room of the invention with a portion of the room broken away.

FIG. 7 is a sectional detail of the conduit and chute connections between modules.

FIG. 8 is a detail front elevation view of the housing and door frame of FIG. 4.

DETAILED DESCRIPTION OF PREFERRED EMBODIMENTS

Figure 1:
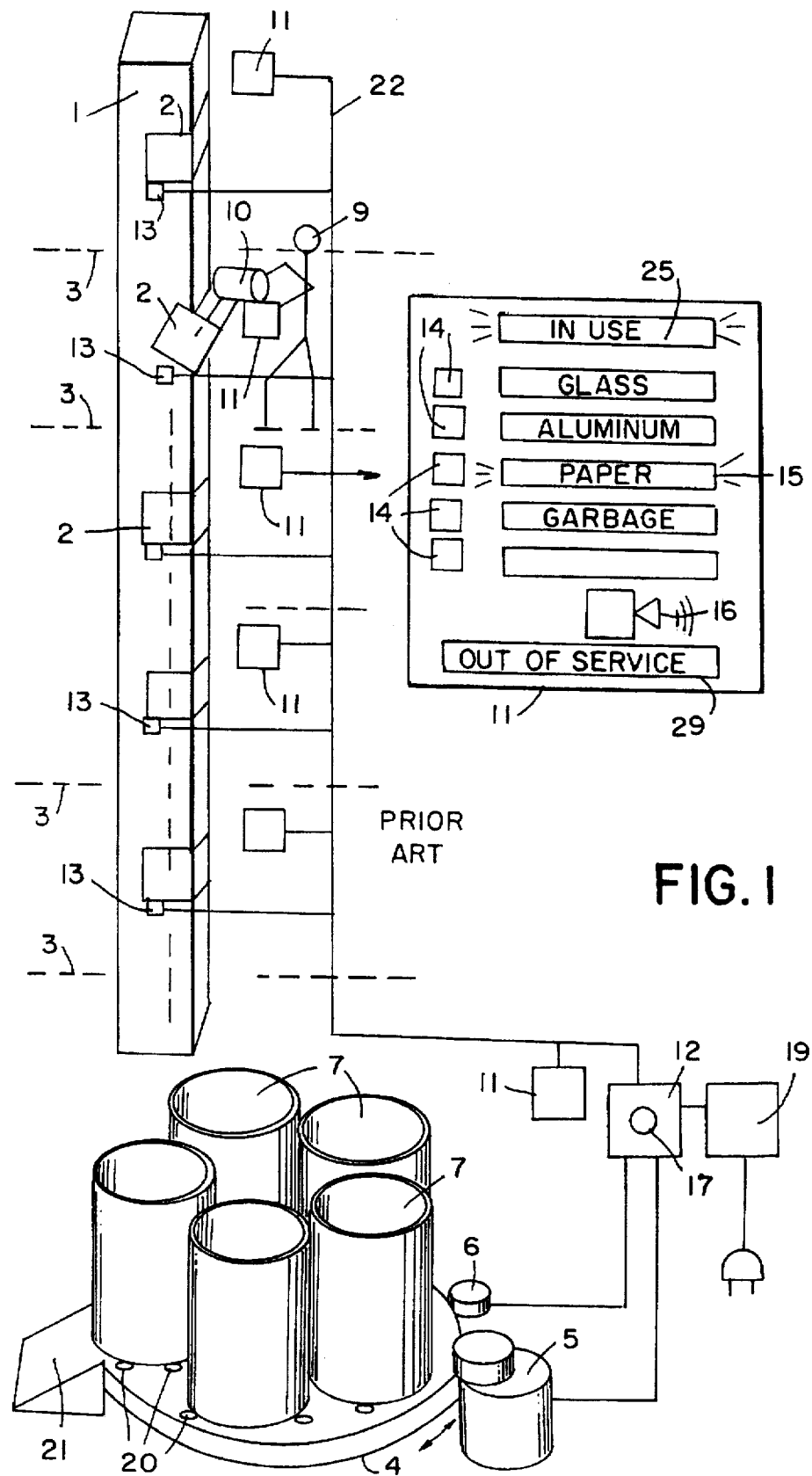
FIG. 1 is a perspective view, partially diagrammatic and not all to the same scale, of the system of the prior art with a turntable platform and one control panel greatly enlarged.

Referring now first to the system of the prior art shown in FIG. 1, a waste chute 1 has an access door 2 on each floor 3 of a multi-story building. These structures may be of the type well known in the art. To dispose of waste, a tenant 9 carries a container 10 of separated waste to the access door 2 on his floor. At control housing and panel 11 mounted on a wall adjacent door 2, he pushes pushbutton 14 to select a receptacle 7 in the basement to correspond to the type of waste he wishes to dispose (paper in this case). All the control panels are operatively connected to central control 12 by conduits 22. Beneath the chute 1, in the basement, a platform 4 holds a set of waste receptacles 7, one for each type of separated waste, such as clear glass, colored glass, aluminum, paper and all other wastes or garbage. The movable platform 4 is a turntable that is rotated by motor 5. A position sensor 6 senses the rotary position of the platform 4. The centrally control 12 operates the motor 5 that cooperates with the position sensor 6 in a servo relationship to rotate the platform 4 until the selected (paper) receptacle is directly beneath chute 7.

A door sensor and lock assembly 13 at each door 2 is also connected to the central control 12. While the platform is moving, the central control 12 actuates all the door looks to prevent waste falling while receptacles are moving. If any door is open, its door sensor will communicate that information to the central control 12 which may inhibit operation of motor 5 and platform motion.

When the selected receptacle is in position as determined by position sensor 6, the motor 5 stops, the lock at the door of the user opens and the selected item 15 on every control panel 11 lights up. A sonic indicator 16 sounds to notify that the system is ready to receive the selected waste. After a preselected time interval during which the door has remained closed, all the doors unlock so that another floor can use the system.

When any door is locked, all the other doors are locked and the "in use" light 25 on each panel is illuminated. A duplicate panel 11 in the basement facilitates service and indicates which door has been left open. In addition, a control switch 17 provides for disabling the controls on the floors while emptying the receptacles, which illuminates the "out of service" lights 29. A power supply 19 for the system is powered by the line power and the electronic controls in the central control 12 may be of the programmed microprocessor type with multiple inputs that is well known in the art. It may indicate service problems and may telephone for service.

The receptacles 7 may be provided with wheels 20 for ease in rolling down ramp 21 when full.

Referring now to FIGS. 2–4,7,8, the invention comprises a plurality of modular chute assembly sections B6 having a tubular shape with a vertical axial bore B1 having a circular cross section. 50. Affixed to the outside of the sidewall 34 of the chute is a conduit 22 for protectively carrying wires between floors and to the basement control. A radially outward distention of the sidewall forms a protuberance 35 provided with a vertical portal 38. The portal 38 is provided with a rigid frame assembly 37. A self closing door 2 is hingedly connected to a first edge 39 of the frame. A housing 41 is rigidly attached to the frame at another edge 40. Contained within the housing is a circuit board 47 and various signal lights 45, sonic signal 46, door lock 44, door condition sensor 43, and pushbutton controls 14. Wires 28 interconnect the electronics in the housing from one floor to other floors and the basement as desired. To provide the necessary protection to the wiring from trauma and fire, the interconnecting wires pass through upper conduit portion 26 and lower conduit portion 27. These wires terminate in plug together connectors. The connectors 48 are contained within connector receptacles 55. These receptacles slide along the conduit and can be locked in place on the conduit with locking collar 49 until ready for assembly, the connector is held protectively within its receptacle, and the receptacle is locked on the conduit protectively so that it does not protrude beyond the end 32 or 33 of the tubular sidewall. The conduit termination is in the form of a sliding connector receptacle 55 that locks onto the conduit by means of a locking collar 49 that may include a set screw, cam lock or other means well known in the art for securing a sliding sleeve on a tube. When the sections are installed and joined together, then the wires of each section are plugged together with connectors 48, the receptacles are unlocked and slidingly joined together and then locked onto their conduits to provide electrically secure conduit continuity. The tubular sections may join together in a nesting or telescoping joint 52 in which a downstream end 33 has a reduced diameter that slides into an enlarged upstream end 32. A unitary bezel 42 bolts onto the frame assembly 37 and covers the housing and frame with a finished appearance and apertures for the necessary indicator lights and control buttons or switches.

Each modular chute assembly section 36 is enclosed within a chute room assembly 65 to form a module 64 of the invention. The modules are stacked one atop the other to form the complete waste chute system with the individual chute assembly sections 36 aligned to form one continuous chute.

The chute room assembly contains one chute room for each port in the chute section. In the case of FIG. 2, the chute section 36 has a single access port 38 and a single chute room 63 encloses the section in a fire safe enclosure to form the module 64 of the invention.

The room includes steel corner angle members 66 to which are welded the steel wall plates 67. A steel ceiling plate 68 is welded to the wall plates. A steel floor plate 69 is welded to the wall plates to thereby totally enclose the chute section within a fire safe enclosure. The usual fire safety partition construction is provided such a gypsum plaster well known in the art to satisfy the fire rating requirements for the chute and the room walls.

Figure 3:
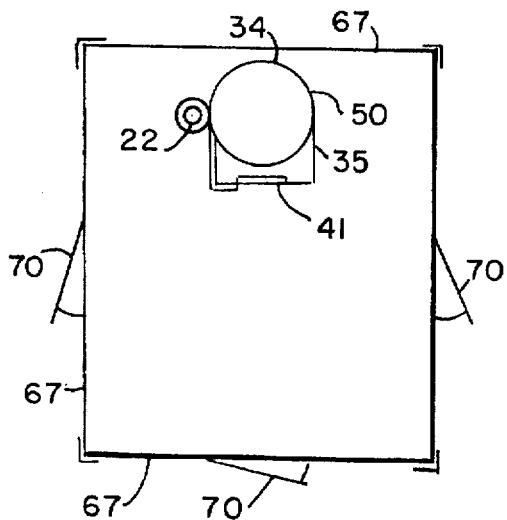
FIG. 3 is a sectional view taken on line A—A of FIG. 2.
Figure 4:
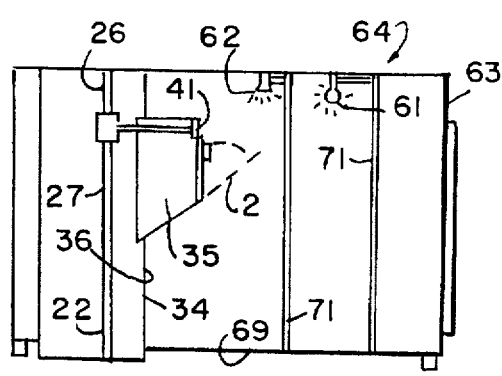
FIG. 4 is a sectional view taken on line B—B of FIG. 2.

The top 32 of the chute section is welded to the perimeter of an aperture in the ceiling plate 68 receiving the chute and the bottom 33 of the chute section 69 is welded to the perimeter of the aperture in the floor plate 69 receiving the chute so as to fully enclose the chute. Each fire safe room is provided with a self closing portal or door 70 to permit user access to the chute and to close off the chute and its door and accessories for fire safety. Because unprotected waste chutes can serve as a chimney in a building fire, fire safety regulations for them are especially stringent. The module may further include water conduits 60 for the sprinkler 62 and wiring conduit 71 for the room lights 61. The portal 70 may be on one or more walls of the room as required. The chute may be of circular cross section as shown in FIG. 3, or, as shown in FIGS. 5, 6 the chute sidewall may have a rectangular cross section and may be mounted against one wall of the room.

In addition to meeting all safety requirements, the system, when installed in the United States, must meet the requirements of the Americans With Disabilities Act.

Figure 5:
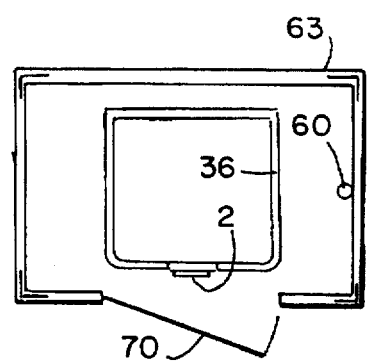
FIG. 5 is a sectional view as in FIG. 3 of another embodiment of the invention with a rectangular chute.
Figure 6:
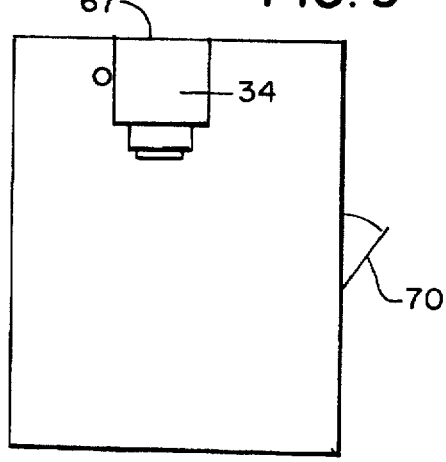
FIG. 6 is a sectional view as in FIG. 3 of another embodiment of the invention with a rectangular chute against a wall of the room.

FIG. 5 shows an embodiment of the invention which may provide easier access to a wheelchair bound user as well as reducing the total space occupied by the system. It is for a simple manual waste disposal chute without the receptacle changing features. A conduit or pipe 60 for water for washing down the inside of the chute as is well known in the art, or for fire sprinklers is provided within the fire safe room 63. Also within the room is the single chute section 36. The portal 70 is close enough to the access door 2 that a user may access the chute door 2 through open portal 70 without having to enter the room. This is especially helpful for a user confined to a wheelchair. While it provides a separate room containing the chute for fire safety, it occupies much less space in the building. This greatly simplifies architectural problems as well as increasing useable space and reducing costs.

Figure 9:
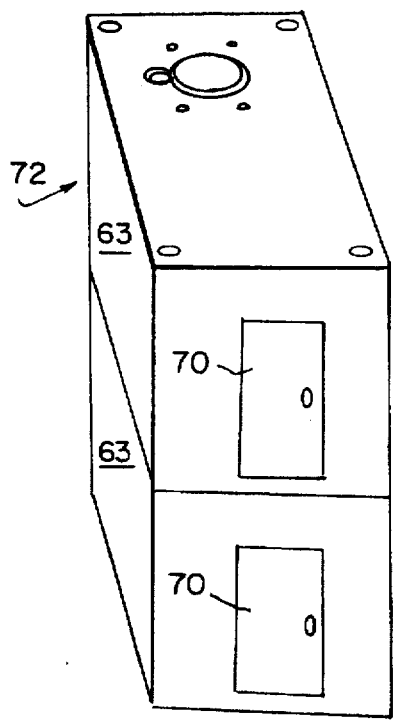
FIG. 9 is a perspective view of a two story module of the invention.

FIG. 9 shows an alternative embodiment of the invention in which the module 72 has a chute room assembly 65 with two fire safe rooms 63 to serve 2 floors of a building.

The module may be made longer with three or more fire safe rooms (not shown) as is readily apparent from the description.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. In a system for selective, separated collection of waste in a plurality of waste collection receptacles in a building having a plurality of floorstand an elongate vertical chute with an access door at each floor from which waste is to be collected, the chute being enclosed in a chute room on each floor from which waste is to be collected, a receptacle mover for moving a selected one of the plurality of receptacles beneath the chute to receive a particular category of waste deposited through the access door, waste category selection means for selecting a category of waste to be received by a receptacle, and means for controlling the receptacle mover to move a receptacle beneath the chute suitable for a selected waste category, the improvement comprising:

a module combining a chute section and a chute room assembly which can be joined with other such modules, one atop the other, to form a multistory gravity conveyor chute for waste, the module having at least one said access door and at least one said chute room enclosing said access door for serving at least one floor;

1) said chute section comprising:
  A) a sidewall having basically a tubular shape with a vertical axial bore which guides waste items falling through the bore thereof, said section having an upstream end opening for venting and for receiving items dropped into said section from above, a downstream end opening for discharging items passing through the bore, at least one of the ends being selectively engagable with an adjacent section of another module to form a conveyor chute longer than a single section;
  B) at least one radially outward distention of the sidewall at a position intermediate the upstream and downstream ends forming a protuberance, the protuberance provided with a substantially vertical port through which items can be dropped into the bore of the section, the port provided with a rigid frame assembly; and
  C) an access door pivotally attached to said rigid frame assembly;

2) said chute room assembly comprising:
  A) one chute room for each port in the chute section, the room comprising:
    i) a floor;
    ii) a ceiling;
    iii) vertical wall means for Joining the floor and ceiling to accommodate a user of the system, the wall means surrounding the access door and the sidewall of the chute, the floor and ceiling being affixed to the sidewall of the chute;
    iiii) a closable portal in the wall means to provide user access and to close off the room for fire safety;

3) a housing attached to one of said rigid frame assembly or the wall means within the room, the housing provided with:
  A) waste category selection means for selectively controlling a category of waste to be received;
  B) signal means for conveying operating condition information; and 4) electrical conduit means for containing electric wiring, the conduit means connected to the housing and extending from the housing to a top conduit termination adjacent the ceiling of an uppermost chute room of said chute room assembly and to a bottom conduit termination adjacent the floor of a lowermost chute room of said chute room assembly, and wiring operatively connected to the housing and extending through said conduit means to the top conduit termination and bottom conduit termination, the wiring terminating in connectors at both of the terminations so as to provide a prewired module that can be joined to other modules by simply plugging connectors together.

2. The module according to claim 1, in which the conduit terminations are provided with means for joining adjacent terminations together to provide for complete enclosure of the wiring between adjacent sections.

3. The module according to claim 2, in which the tubular shape is substantially circular in cross section.

4. The module according to claim 2, in which the tubular shape is substantially rectangular in cross section.

5. In a system for selective, separated collection of waste in a plurality of waste collection receptacles in a building having a plurality of floors End an elongate vertical chute with an access door at each floor from which waste is to be collected, the chute being enclosed in a chute room on each floor from which waste is to be collected, a receptacle mover for moving a selected one of the plurality of receptacles beneath the chute to receive a particular category of waste deposited through the access door, waste category selection means for selecting a category of waste to be received by a receptacle, and means for controlling the receptacle mover to move a receptacle beneath the chute suitable for a selected waste category, the improvement comprising:

a module combining a chute section and a chute room assembly which can be joined with other such modules, one atop the other, to form a multistory gravity conveyor chute for waste, the module having at least one said access door and at least one said chute room enclosing said access door for serving at least one floor;

1) said chute section comprising:
  A) a sidewall having basically a tubular shape with a vertical axial bore which guides waste items falling through the bore thereof, said section having an upstream end opening for venting and for receiving items dropped into said section from above, a downstream end opening for discharging items passing through the bore, at least one of the ends being selectively engagable with an adjacent section of another module to form a conveyor chute longer than a single section;
  B) at least one radially outward distention of the sidewall at a position intermediate the upstream and downstream ends forming a protuberance, the protuberance provided with a substantially vertical port through which items can be dropped into the bore of the section, the port provided with a rigid frame assembly; and C) an access door pivotally attached to said rigid frame assembly;

2) said chute room assembly comprising:

A) one chute room for each port in the chute section, the room comprising:
  i) a floor;
  ii) a ceiling;
  iii) vertical wall means for joining the floor and ceiling to accommodate a user of the system, the wall means surrounding the access door and the sidewall of the chute, the floor and ceiling being affixed to the sidewall of the chute;
  iiii) a closable portal in the wall means to provide user access and to close off the room for fire safety;

3) a housing attached to said rigid frame assembly, the housing provided with:
  A) waste category selection means for selectively controlling a category of waste to be received;
  B) signal means for conveying operating condition information;
  C) an electrically powered door lock means for selectively preventing access to the port;
  D) position signalling means for signalling when the door open or closed; and 4) electrical conduit means for containing electric wiring, the conduit means connected to the housing and extending from the housing to a top conduit termination adjacent the ceiling of an uppermost chute room of said chute room assembly and to a bottom conduit termination adjacent the floor of a lowermost chute room of said chute room assembly and wiring operatively connected to the housing and extending through said conduit means to the top conduit termination and bottom conduit termination, the wiring terminating in connectors at both of the terminations so as to provide a prewired module that can be joined to other modules by simply plugging connectors together.

6. The module according to claim 5, in which the conduit terminations are provided with means for joining adjacent terminations together to provide for complete enclosure of the wiring between adjacent sections.

7. The module according to claim 6, in which the tubular shape is substantially circular in cross section.

8. The module according to claim 6, in which the tubular shape is substantially rectangular in cross section.

9. In a system for collection of waste in a building having a plurality of floors and an elongate vertical chute with an access door at each floor from which waste is to be collected, the chute being enclosed in a fire safe chute room on each floor from which waste is to be collected, the improvement comprising:

a module combining a chute section and a chute room assembly which which can be joined with other such modules, one atop the other, to form a multistory gravity conveyor chute for waste, the module having at least one said access door and at least one said chute room enclosing said access door for serving at least one floor;

1) said chute section comprising:

A) a sidewall having basically a tubular shape with a vertical axial bore which guides waste items falling through the bore thereof, said section having an upstream end opening for venting and for receiving items dropped into said section from above, a downstream end opening for discharging items passing through the bore, at least the of the ends being selectively engagable with an adjacent section of another module to form a conveyor chute longer than a single section;

B) at least one radially outward distention of the sidewall at a position intermediate the upstream and downstream ends forming a protuberance, the protuberance provided with a substantially vertical port through which items can be dropped into the bore of the section, the port provided with a rigid frame assembly; and C) an access door pivotally attached to said rigid frame assembly; and 2) said chute room assembly comprising:

A) one chute room for each port in the chute section, the room comprising:
  i) a floor;
  ii) a ceiling;
  iii) vertical wall means for joining the floor and ceiling, the wall means surrounding the access door and the sidewall of the chute, the floor and ceiling being affixed to the sidewall of the chute;
  iii) a closable portal in the wall means to provide user access and to close off the room for fire safety;

to thereby provide a module that can be joined to other modules by laying one atop the other.

10. The module according to claim 9, in which the tubular shape is substantially circular in cross section.

11. The module according to claim 9, in which the tubular shape is substantially rectangular in cross section.

12. The module according to claim 9, in which the access door is disposed close enough to the closable portal that said user may access the door through the open portal without having to fully enter the room.

13. The module according to claim 9, in which the chute room assembly includes two chute rooms.

14. The module according to claim 9, in which the chute room assembly includes three chute rooms.

15. The module according to claim 1, in which the access door is disposed close enough to the closable portal that said user may access the door through the open portal without having to fully enter the room.

16. The module according to claim 1, in which the chute room assembly includes two chute rooms.

17. The module according to claim 1, in which the chute room assembly includes three chute rooms.

* * * * *